US011766736B2

(12) United States Patent
Wang et al.

(10) Patent No.: US 11,766,736 B2
(45) Date of Patent: Sep. 26, 2023

(54) METHOD UTILIZING COLD WELDING TO PREPARE GRAIN BOUNDARIES HAVING DIFFERENT INCLUDED ANGLES

(71) Applicant: Beijing University of Technology, Beijing (CN)

(72) Inventors: Lihua Wang, Beijing (CN); Dongwei Li, Beijing (CN); Yan Ma, Beijing (CN); Xiaodong Han, Beijing (CN); Qingsong Deng, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 17/880,794

(22) Filed: Aug. 4, 2022

(65) Prior Publication Data

US 2023/0039597 A1    Feb. 9, 2023

(30) Foreign Application Priority Data

Aug. 4, 2021   (CN) .......................... 202110891858.1

(51) Int. Cl.
*B23K 20/00* (2006.01)
*B23K 31/12* (2006.01)
(Continued)

(52) U.S. Cl.
CPC ............ *B23K 20/00* (2013.01); *B23K 20/004* (2013.01); *B23K 20/26* (2013.01); *B23K 31/12* (2013.01); *G01N 1/286* (2013.01); *G01N 3/08* (2013.01)

(58) Field of Classification Search
CPC .... B23K 37/04; B23K 37/0426; B23K 31/12; B23K 20/26; B23K 20/00; B23K 20/002;
(Continued)

(56) References Cited

U.S. PATENT DOCUMENTS

2010/0154557 A1*  6/2010  Han .......................... G01N 3/08
250/311

FOREIGN PATENT DOCUMENTS

CN         1963985 A   *  5/2007
CN       201159705 Y   * 12/2008
(Continued)

OTHER PUBLICATIONS

Yang Lu et al., "Cold welding of ultrathin gold nanowires", Feb. 14, 2010, Nature nanotechnology, vol. 5, pp. 218-224 (Year: 2010).*

*Primary Examiner* — Matthew P Travers
(74) *Attorney, Agent, or Firm* — Bayramoglu Law Offices LLC

(57) ABSTRACT

A method utilizing cold welding to prepare grain boundaries having different included angles includes using a device including a support member. Two bent members are arranged opposite to each other in the support member. One ends of the two bent members are both fixedly connected to the support member, one end, away from the support member, of any bent member is fixedly connected to a first sample, one end, away from the support member, of the other bent member is fixedly connected to a second sample, and the first sample and the second sample are arranged corresponding to each other. The bent member includes a first metal sheet and a second metal sheet having different thermal expansion coefficients. An angle between the first sample and the second sample during butt welding can be controlled by changing an included angle of a bimetallic sheet.

8 Claims, 1 Drawing Sheet

(51) Int. Cl.
*B23K 20/26* (2006.01)
*G01N 1/28* (2006.01)
*G01N 3/08* (2006.01)

(58) Field of Classification Search
CPC .... B23K 20/004; B23K 20/028; B23K 20/24;
G01N 3/08; G01N 2203/04; G01N 1/286;
G01N 2001/2873; G01N 2203/0298;
G01N 33/207; G01N 2203/0296; G01N
2203/0286; B82Y 35/00
See application file for complete search history.

(56) References Cited

FOREIGN PATENT DOCUMENTS

| | | | | | |
|---|---|---|---|---|---|
| CN | 104634660 | A | * | 5/2015 | |
| CN | 104897699 | A | * | 9/2015 | |
| CN | 106033039 | A | * | 10/2016 | |
| CN | 113138125 | A | * | 7/2021 | ............... G01N 1/28 |

* cited by examiner

METHOD UTILIZING COLD WELDING TO PREPARE GRAIN BOUNDARIES HAVING DIFFERENT INCLUDED ANGLES

CROSS REFERENCE TO THE RELATED APPLICATIONS

This application is based upon and claims priority to Chinese Patent Application No: 202110891858.1, filed on Aug. 4, 2021, the entire contents of which are incorporated herein by reference.

TECHNICAL FIELD

The present disclosure relates to the technical field of material deformation, and in particular to a method utilizing cold welding to prepare grain boundaries having different included angles.

BACKGROUND

With micro/nano devices developed and applied constantly, higher requirements are put forward for nano structured materials and micro/nano machining technologies, of which related fields have gained great concerns in the current material research and development. The research found that owing to the decrease in material size, and the increase in specific surface area, the material interface plays an increasingly prominent role in the deformation process, so that the structural evolution and mechanical behavior of the nano materials in the deformation process differ greatly from the structural evolution and mechanical behavior of the macroscopic bulk materials. Therefore, the research on the grain boundaries of the nano materials is of great importance for exploring the structural evolution of the nano materials, and realizing the performance design of the nano materials.

It is effective to utilize welding to prepare grain boundaries having the specific orientation angle in materials. The nano-scale welding of the metal is also the important technical means for the bottom-up assembly of the nano device. Generally, being the existing metal welding technology, the heat welding machining is to form a molten area between the workpiece and the welding flux through local heating and pressurizing, and connect two or more materials into a whole through the combination or diffusion between atoms or molecules, which has the high requirements for the machining technology. However, the micro/nano device is extremely sensitive to the size and structure of the material, and the material damage and internal stress caused by heat welding may influence the performance of the micro/nano device. Therefore, it is highly difficult to apply the heat welding technology to the nano material machining. Therefore, as the bottom-up nano-manufacturing technology, cold welding is deemed very promising. The researchers first found in the macroscopic scale that owing to the surface atomic diffusion, the bulk metal materials carry out spontaneous cold welding under the large compressive stress contact for a long time. Compared with heat welding, cold welding features the low heat input, small stress, no chemical change of materials, etc. Lu Yang et al. of Rice University found that gold and silver nano wires having the size below 10 nm can be spontaneously fused together to form defect-free single crystal nano wires even without applying heat and pressure when they make contact with each other. The further research found that the cold welding phenomenon exists in the welding of various noble metal nano wires having the characteristic size less than 10 nm in a wide range. Guo Chuan Fei et al. of Houston University found from the research on polycrystal gold nano wire network that the coarse gold nano wires (about 100 nm) can also carry out spontaneous cold welding, with the electrical properties basically unchanged. The researchers pointed out that the application of cold welding to assembly of micro/nano electromechanical devices is expected to reduce the local stress of materials, and the chemical reaction in the welding area, and reduce or even eliminate the influence from welding on the performance of the micro/nano devices. Therefore, it is of great importance to explore the cold welding process of nano materials for the development of the next generation of advanced micro/nano electromechanical devices.

However, the extraction, positioning, butting, etc. of nano wires have the high requirements for the sample characterization and operation precision, and the nano wires are sensitive to environmental changes. Therefore, it is technically difficult to research nano wire butt welding. Currently, the methods for researching nano wire cold welding are mainly divided into two types, which are both implemented in the transmission electron microscope (TEM) platform. The first type is the breaking-welding method. That is, the micro-electromechanical system (MEMS) device is generally used to break the pre-fixed nano wire, and then carries out butting in the TEM for cold welding. According to the method, two broken nano wire sections are aligned with each other easily, so that the samples are prepared conveniently. However, it is difficult to realize cold welding of nano wires of different types and different orientations. The second type is the probe method. That is, the probe capable of moving in the three-dimensional direction in a TEM pole shoe is generally used to carry one nano wire, the other nano wire is fixed on the sample rod carrier, and the two nano wires are butt-welded by controlling the movement of the probe. According to the method, cold welding of nano wires of different types and different orientations can be realized. However, it is difficult to employ the current micro/nano electromechanical technology to realize the in-situ double-inclination of such a sample rod. Therefore, the researchers can hardly obtain the structural information in the sample deformation process.

Therefore, in the art, it is still urgent to develop a sample preparation method and device. In this way, the preparation process can be simplified, the difficulties in extracting, positioning, and butt welding the nano wires are reduced, the application range is wide, the sample stability and the atomic-scale characterization precision in the butt welding process of the nano wires can be retained.

SUMMARY

An objective of the present disclosure is to provide a method utilizing cold welding to prepare grain boundaries having different included angles, to solve the problems in the prior art, to control an angle between a first sample and a second sample during butt welding by changing an included angle of a bimetallic sheet, so as to design an orientation angle of a grain boundary formed through cold welding. A device of the present disclosure retains a machining visual field of a focused ion beam system to the maximum extent, without influencing an in-situ atomic-scale observation of a butt tip of the sample. In addition, the device may also realize butt welding of materials of different types, to prepare grain boundaries of heterogeneous materials.

In order to realize the objective described above, the present disclosure provides the solution as follows: the present disclosure provides a method utilizing cold welding to prepare grain boundaries having different included angles. A device includes a support member, two bent members being arranged in the support member, and arranged opposite each other, one ends of the two bent members being both fixedly connected to the support member, one end, away from the support member, of any bent member being fixedly connected to a first sample through a fixing member, one end, away from the support member, of the other bent member being fixedly connected to a second sample through a fixing member, and the first sample and the second sample being arranged corresponding to each other; and the bent member includes a first metal sheet and a second metal sheet having different thermal expansion coefficients, the first metal sheet being positioned between the second metal sheet and the support member, the first metal sheet being fixedly attached to the second metal sheet, and the fixing member being fixedly connected to the second metal sheet.

Preferably, the support member includes a semicircular metal ring, a workbench being arranged in the semicircular metal ring, the workbench being fixedly connected to a bottom of the semicircular metal ring, the first metal sheet and the second metal sheet being both fixedly connected to side walls of the workbench, and the first metal sheet being positioned between the second metal sheet and the semicircular metal ring.

Preferably, the second metal sheet has a smaller thermal expansion coefficient than the first metal sheet.

Preferably, the fixing member includes an aluminum sheet fixedly connected to the second metal sheet, the first sample being fixedly connected to the aluminum sheet, and the second sample being fixedly connected to the aluminum sheet.

Preferably, one end, away from the aluminum sheet, of the first sample has a smaller diameter than one end, close to the aluminum sheet, of the first sample, and one end, away from the aluminum sheet, of the second sample has a smaller diameter than one end, close to the aluminum sheet, of the second sample.

Preferably, the first metal sheet is made of nickel, and the second metal sheet is made of molybdenum.

Preferably, a distance between the two second metal sheets is 30 μm-50 μm.

Operation steps of a method utilizing cold welding to prepare grain boundaries having different included angles include:
a. pre-machining the first sample and the second sample: machining bulk materials, to form microcolumns;
b. forming the first sample and the second sample: machining the microcolumns, to form the first sample and the second sample after step a is finished;
c. mounting the first sample and the second sample: fixing the first sample and the second sample on two second metal sheets, respectively after step b is finished;
d. starting cold welding: heating the first metal sheet and the second metal sheet after step c is finished; and
e. starting a detection experiment: changing a heating temperature after step d is finished, and observing morphological changes of the first sample and the second sample.

Preferably, in step a, the bulk materials are machined to obtain the microcolumns through a focused ion beam technique.

Preferably, in step b, the microcolumns are machined to obtain the first sample and the second sample through a nano mill.

The present disclosure has the technical effects as follows:
1. The present disclosure utilizes a characteristic that the first metal sheet and the second metal sheet having different thermal expansion coefficients are bent when heated to realize butt welding between the first sample and the second sample, and comprehensively utilizes deformation functions of the first metal sheet and the second metal sheet, to realize cold welding between the first sample and the second sample, thereby reducing material damage to the first sample and the second sample, and improving material performance.
2. By changing the included angle between the first metal sheet and the second metal sheet, the present disclosure retains the machining visual field of the focused ion beam system to the maximum extent, and may control the angle during butt welding of the samples.
3. The present disclosure may realize both butt deformation of materials of the same type and different orientations, and butt deformation of materials of different types and different orientations, and thus features a wide application range, little limitation, and high practicability.
4. According to the present disclosure, several first samples and several second samples may be arranged on the bent members simultaneously, so that a plurality of first samples and a plurality of second samples may be welded simultaneously.

BRIEF DESCRIPTION OF THE DRAWINGS

In order to describe the technical solutions in the embodiments of the present disclosure or in the prior art more clearly, the accompanying drawings required in the embodiments will be described below briefly. Apparently, the accompanying drawings in the following description show merely some embodiments of the present disclosure, and other accompanying drawings may be derived from these accompanying drawings by those of ordinary skill in the art without making inventive efforts.

Figure 1:
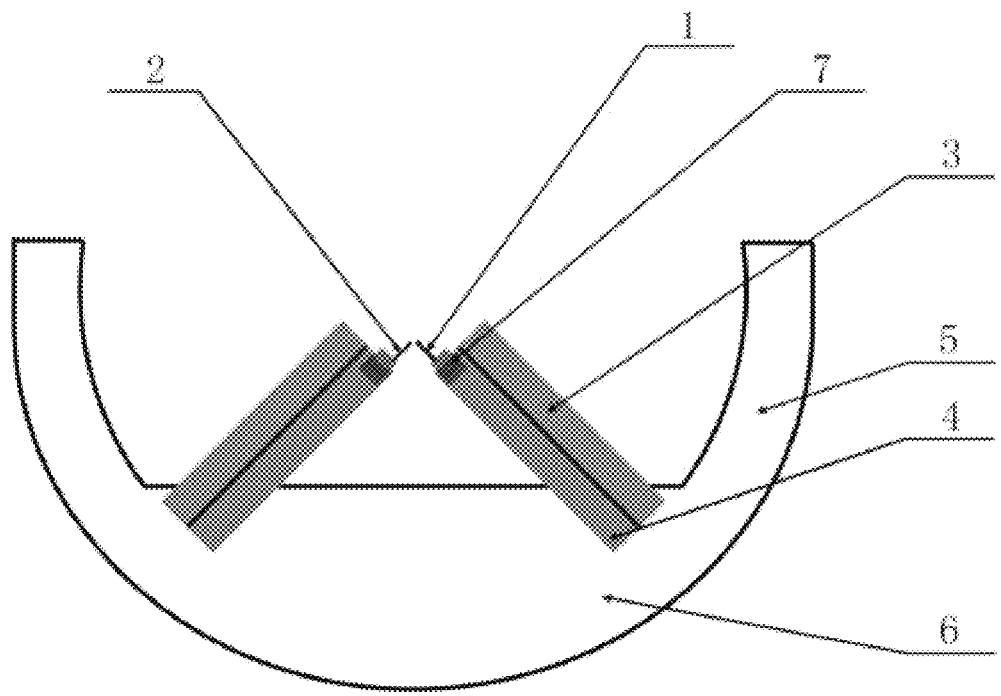
FIG. 1 is a schematic diagram of a position relation between a first sample and a second sample.
Figure 2:
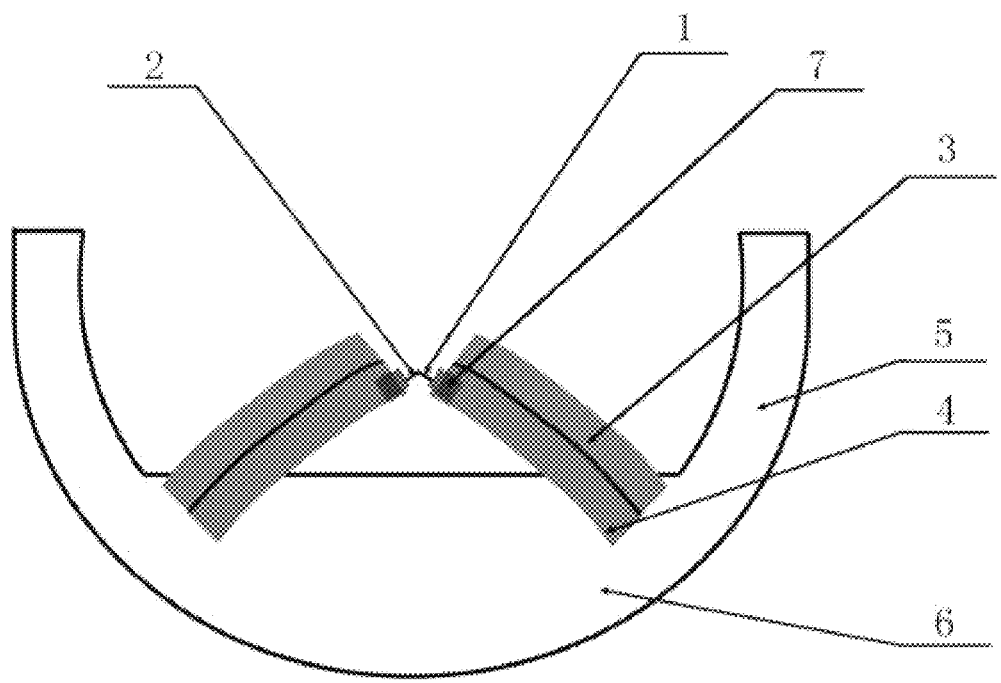
FIG. 2 is a schematic diagram of a first sample and a second sample in butt welding through heating.

In the figures, 1—first sample, 2—second sample, 3—first metal sheet, 4—second metal sheet, 5—semicircular metal ring, 6—workbench, and 7—aluminum sheet.

DETAILED DESCRIPTION OF THE EMBODIMENTS

The technical solutions in the embodiments of the present disclosure are clearly and completely described below with reference to the accompanying drawings in the embodiments of the present disclosure. Apparently, the described embodiments are merely some, rather than all, of embodiments of the present disclosure. Based on the embodiments of the present disclosure, all other embodiments acquired by those of ordinary skill in the art without making inventive efforts fall within the scope of protection of the present disclosure.

In order to make the above objectives, features, and advantages of the present disclosure clearer and more comprehensible, the present disclosure will be further described in detail below with reference to the accompanying drawings and the specific implementations.

The present disclosure provides a method utilizing cold welding to prepare grain boundaries having different included angles. A device includes a support member, two bent members being arranged in the support member, and arranged opposite each other, one end of the two bent member being both fixedly connected to the support member, one end, away from the support member, of any bent member being fixedly connected to a first sample 1 through a fixing member, one end, away from the support member, of the other bent member being fixedly connected to a second sample 2 through a fixing member, and the first sample 1 and the second sample 2 being arranged corresponding to each other; where the bent member includes a first metal sheet 3 and a second metal sheet 4 having different thermal expansion coefficients, the first metal sheet 3 being positioned between the second metal sheet 4 and the support member, the first metal sheet 3 being fixedly attached to the second metal sheet 4, and the fixing member being fixedly connected to the second metal sheet 4.

The first sample 1 and the second sample 2 are both nano wires, and materials of the first sample 1 and the second sample 2 may be the same or not, and the materials of the first sample 1 and the second sample 2 may be selected according to actual needs, so as to widen application ranges of the device and the method.

Two second metal sheets 4 are symmetrically distributed at an angle of 45°, and the bent member is formed by carrying out welding, pressing, and attaching on the first metal sheet 3 and the second metal sheet 4 having different thermal expansion coefficients. When being heated, the bent member formed by the first metal sheet 3 and the second metal sheet 4 is bent due to different thermal expansion coefficients of the first metal sheet 3 and the second metal sheet 4, and then the first sample 1 and the second sample 2 are close to each other. A heating temperature of the first metal sheet 3 and the second metal sheet 4 is lower than a melt point temperature of the first sample 1 or the second sample 2, so that contact welding between the first sample 1 and the second sample 2 is cold welding. Compared with exist heat welding, cold welding reduces material damage to the first sample 1 and the second sample 2. Compared with existing cold welding, positioning and butting precision of the first sample 1 and the second sample 2 is improved, and a cold welding process of the first sample 1 and the second sample 2 is convenient to observe.

The first sample 1 and the second sample 2 are arranged in parallel in an extension direction of the two second metal sheets 4, respectively, so as to facilitate subsequent welding.

Several first samples 1 and several second samples 2 are arranged on the bent members, several first samples 1 are arranged in parallel, and several second samples 2 are arranged in parallel. Since the bent member has the same bending degree, when the bent member is bent when heated, several first samples 1 make contact with several second samples 2 for welding, so that a welding manufacturing efficiency is improved.

In a further optimized solution, the support member includes a semicircular metal ring 5, a workbench 6 being arranged in the semicircular metal ring 5, the workbench 6 being fixedly connected to a bottom of the semicircular metal ring 5, the first metal sheet 3 and the second metal sheet 4 being both fixedly connected to side walls of the workbench 6, and the first metal sheet 3 being positioned between the second metal sheet 4 and the semicircular metal ring 5. The semicircular metal ring 5 is made of tungsten, and has an outer diameter of 3 mm, an inner diameter of 2 mm, and a thickness of 15 μm-30 μm. The workbench 6 is fixedly connected in the semicircular metal ring 5, and one end of the first metal sheet 3 and one end of the second metal sheet 4 are both fixedly connected to the workbench 6.

In a further optimized solution, the second metal sheet 4 has a smaller thermal expansion coefficient than the first metal sheet 3. The second metal sheet 4 positioned on an inner side relatively has a small thermal expansion coefficient, and the first metal sheet 3 positioned on an outer side has a large thermal expansion coefficient. Through heating, a bimetallic sheet is bent inwards to deform, so that the first sample 1 and the second sample 2 are close to each other. By changing the heating temperature, the first metal sheet 3 and the second metal sheet 4 displace by different distances, so that the first sample 1 and the second sample 2 are subjected to cold welding at different angles.

In a further optimized solution, the fixing member includes an aluminum sheet 7 fixedly connected to the second metal sheet 4, the first sample 1 being fixedly connected to the aluminum sheet 7, and the second sample 2 being fixedly connected to the aluminum sheet 7. The aluminum sheet 7 has a length of 100 μm, a thickness of 1 μm, and a width of 150 μm. The aluminum sheet 7 functions to fix the first sample 1 or the second sample 2 on the second metal sheet 4. The first sample 1 or the second sample 2 is fixed on the aluminum sheet 7 through a platinum (Pt)-carbon vapor deposition method. According to the Pt-carbon vapor deposition method, the first sample 1 or the second sample 2 is placed on the aluminum sheet 7, and a Pt-carbon mixture is deposited on the aluminum sheet 7, to fix the first sample 1 or the second sample 2 on the aluminum sheet 7, and to play a role in shock absorption and preventing the first sample 1 or the second sample 2 from being contaminated.

In a further optimized solution, one end, away from the aluminum sheet 7, of the first sample 1 has a smaller diameter than one end, close to the aluminum sheet 7, of the first sample 1, and one end, away from the aluminum sheet 7, of the second sample 2 has a smaller diameter than one end, close to the aluminum sheet 7, of the second sample 2. Experimental materials are precisely thinned through a microcolumn machining method, and machined into a pointed cone shape, so that a situation that the first sample 1 or the second sample 2 is bent owing to surface tension may be effectively avoided, and stability of the first sample 1 or the second sample 2 in a deformation process is improved, without influencing an in-situ atomic-scale observation of butt tips of the first sample 1 and the second sample 2.

In a further optimized solution, the first metal sheet 3 is made of nickel, and the second metal sheet 4 is made of molybdenum. The first metal sheet 3 and the second metal sheet 4 both have a length of 0.3 mm-0.5 mm, the molybdenum has a linear thermal expansion coefficient of 5.2, and the nickel has a linear thermal expansion coefficient of 13.0, resulting in a big difference between the thermal expansion coefficients, and good thermal stability.

In a further optimized solution, a distance between the two second metal sheets 4 is 30 μm-50 μm. Since the two second metal sheets 4 are positioned on the inner side, the distance between the two second metal sheets 4 is 30 μm-50 μm, and the first sample 1 and the second sample 2 are effectively welded.

Operation steps of a method utilizing cold welding to prepare grain boundaries having different included angles include:

a. Pre-machine the first sample 1 and the second sample 2: machine bulk materials, to form microcolumns. Firstly, the existing bulk materials are machined to form the microcolumns through the focused ion beam technology, where the microcolumn satisfies secondary machining conditions, so as to carry out subsequent machining smoothly.

b. Form the first sample 1 and the second sample 2: machine the microcolumns, to form the first sample 1 and the second sample 2 after step a is finished. By combining the focused ion beam technique with a nano mill, a nano wire sample which may be subjected to the atomic-scale observation is machined from a tip of the microcolumn, the portion having a length of about 5 μm, and a diameter of about 30 μm.

c. Mount the first sample 1 and the second sample 2: fix the first sample 1 and the second sample 2 on the two second metal sheets 4, respectively after step b is finished. The first sample 1 is placed on the aluminum sheet 7, and the Pt-carbon mixture is deposited on the aluminum sheet 7, so that the first sample 1 is fixed on the aluminum sheet 7. Then the second sample 2 is fixed on the aluminum sheet 7 through the same operation method, and a fixed device is placed under a transmission electron microscope.

d. Start cold welding: heat the first metal sheet 3 and the second metal sheet 4 after step c is finished. Temperatures of the first metal sheet 3 and the second metal sheet 4 are raised. Owing to different thermal expansion coefficients of the metals on two sides constituting the bimetallic sheet, the bimetallic sheet is bent inwards, thereby driving the first sample 1 and the second sample 2 for butting and welding. Since a heating temperature for bending the bimetallic sheet is generally far lower than melting points of the metals, butt welding of the metal nano wires in such a condition may be deemed as cold welding.

e. Start a detection experiment: change a heating temperature after step d is finished, and observe morphological changes of the first sample 1 and the second sample 2. In a cold welding process, the transmission electron microscope is utilized to carry out the in-situ atomic-scale observation on a grain boundary formed through cold welding. In such a condition, a deformation behavior of the grain boundary of the sample under tension/compression may be observed by changing the temperature, and the influence from the grain boundary on performance of the material may be tested.

In a further optimized solution, in step a, the bulk materials are machined to obtain the microcolumns through the focused ion beam technique. The focused ion beam technique belongs to an existing technology that may machine materials to form microcolumns, which belongs to the prior art, and is not described in detail herein.

In a further optimized solution, in step b, the microcolumns are machined to obtain the first sample 1 and a second sample 2 through the nano mill. After the nano material is precisely cut and thinned through the microcolumn machining method, a gallium ion damage layer in a machining process is removed through the nano mill, and the nano material is further thinned, so as to finally form the first sample 1 and the second sample 2 of a finished product.

In the description of the present disclosure, it is to be understood that terms such as "longitudinal", "transverse", "upper", "lower", "front", "rear", "left", "right", "vertical", "horizontal", "top", "bottom", "inner", and "outer" indicate an orientation or position relation based on an orientation or position relation shown in the accompanying drawings, are merely used for the ease of describing the present disclosure, do not indicate or imply that the device or element referred to must have a specific orientation, and are constructed and operated in a specific orientation, and thus are not to be interpreted as limiting the present disclosure.

The above embodiments are merely used to describe the preferred modes of the present disclosure, but do not limit the scope of the present disclosure. Without departing from the design spirit of the present disclosure, various modifications and improvements made by those of ordinary skill in the art to the technical solutions of the present disclosure shall all fall within the scope of protection determined by the claims of the present disclosure.

What is claimed is:

1. A method utilizing a cold welding to prepare grain boundaries having different included angles, comprising using a designing and manufacturing device; wherein
   the designing and manufacturing device comprises a support member, two bent members are arranged in the support member and arranged opposite each other,
   a first end of each of the two bent members is fixedly connected to the support member, a second end of a first bent member of the two bent members is fixedly connected to a first sample through a first fixing member, a second end of a second bent member of the two bent members is fixedly connected to a second sample through a second fixing member, the second end of the first bent member and the second end of the second bent member are away from the support member, and the first sample and the second sample are arranged corresponding to each other;
   each of the two bent members comprises a first metal sheet and a second metal sheet having different thermal expansion coefficients wherein the first metal sheet is fixedly attached to the second metal sheet, and each of the first fixing member and the second fixing member is fixedly connected to a respective one of the second metal sheets; and
   a distance between top ends of the two second metal sheets is 30 μm-50 μm;
   the method comprising:
   a. pre-machining the first sample and the second sample by machining bulk materials to form microcolumns;
   b. forming the first sample and the second sample by machining the microcolumns to form the first sample and the second sample after step a is finished;
   c. mounting the first sample and the second sample by fixing the first sample and the second sample on the two second metal sheets, respectively, after step b is finished;
   d. starting the cold welding by heating the first metal sheets and the second metal sheets after step c is finished, so that the first sample and the second sample are brought closer to each other; and
   e. starting a detection experiment by changing a heating temperature after step d is finished, and observing morphological changes of the first sample and the second sample.

2. The method utilizing the cold welding to prepare the grain boundaries having different included angles according to claim 1, wherein the support member comprises a semicircular metal ring, a workbench is arranged in the semicircular metal ring, the workbench is fixedly connected to a bottom of the semicircular metal ring, and the first metal sheets and the second metal sheets are fixedly connected to side walls of the workbench.

3. The method utilizing the cold welding to prepare the grain boundaries having different included angles according to claim 1, wherein the second metal sheets have a smaller thermal expansion coefficient than the first metal sheets.

4. The method utilizing the cold welding to prepare the grain boundaries having different included angles according to claim 3, wherein the first metal sheets are made of nickel, and the second metal sheets are made of molybdenum.

5. The method utilizing the cold welding to prepare the grain boundaries having different included angles according to claim 1, wherein each of the first fixing member and the second fixing member comprises an aluminum sheet fixedly connected to a respective one of the second metal sheets, the first sample is fixedly connected to a first of the aluminum sheets, and the second sample is fixedly connected to a second of the aluminum sheets.

6. The method utilizing the cold welding to prepare the grain boundaries with different included angles according to claim 5, wherein a first end of each of the first sample and the second sample has a smaller diameter than a second end of each of the first sample and the second sample, and the first end of each of the first sample and the second sample is farther away from the first and second aluminum sheets, respectively, than the second end of each of the first sample and the second sample.

7. The method utilizing the cold welding to prepare the grain boundaries having difference included angles according to claim 1, wherein in step a, the bulk materials are machined to obtain the microcolumns through a focused ion beam technique.

8. The method utilizing the cold welding to prepare the grain boundaries having different includes angles according to claim 1, where in step b, the microcolumns are machined to obtain the first sample and the second sample through a nano mill.

* * * * *